3,180,840
OLEFIN OXIDATION CATALYST AND METHOD
OF PREPARATION THEREOF
Adolph C. Shotts, Maplewood, La., assignor, by mesne assignments, to Cities Service Research and Development Company, New York, N.Y., a corporation of New Jersey
No Drawing. Filed Apr. 6, 1960, Ser. No. 20,261
10 Claims. (Cl. 252—443)

This invention in its broadest aspect is concerned with improvements in and relating to oxidation of olefins to carbonyl compounds. In one aspect, the invention relates to a superior oxidation catalyst, its method of preparation, and the employment thereof in the oxidation of olefins to alpha-unsaturated aldehydes and ketones.

Prior art catalysts heretofore employed have all suffered disadvantages of one kind or another despite their limited success. Some have required the use of toxic and generally hazardous co-catalysts such as selenium. Others have involved the use of considerable quantities of such costly materials as silicon carbide. Still others utilize difficult and expensive techniques in the preparation of catalysts which, in spite of the high cost, are unstable and of variable activity, difficult to reactivate or recover, possess poor heat conductivity and poor coherence between the materials, and cause excessive formation of such undesirable by-products as carbon dioxide at the expense of desired products.

It is therefore among the objects of this invention to alleviate the above problems.

One specific object among these is to devise a catalyst which does not incorporate substantial quantities of costly materials such as silicon carbide.

Another specific object is to obviate the necessity for hazardous materials such as selenium in the oxidation of olefins to unsaturated aldehydes and ketones.

It is still another object to provide an oxidation catalyst in such a form that the oxidation can be controlled and whereby hot spots are not experienced.

It is yet another object to improve the conversion, yield, and selectivity of oxidation catalysts.

It is another object to provide a relatively simple method of preparing a superior oxidation catalyst.

To the accomplishment of the foregoing and related ends, an oxidation catalyst is prepared by fusing small discrete particles of silicon carbide into the surface of metallic copper granules or shot, contacting the thus formed catalyst mass with a copper nitrate solution which is oxidized in an oxygen containing gas and subsequently partially reduced with hydrogen whereby a copper oxide coating containing efficacious amounts of cuprous oxide are caused to be subsequently formed in a thin layer over the catalyst support.

In more detail, the preparation of the catalyst is described as comprising heating relatively pure metallic copper to a temperature of about 1,035° C. or until it becomes molten and fluid. The molten copper is then broken up and caused to come in contact with small cool particles of silicon carbide. The copper droplets upon contacting the cool silicon carbide particles will solidify with the particles of silicon carbide being fused in the surface thereof. Of course, it will be readily understood that, in order for the copper granules to be coated in somewhat of a uniform manner, that is, uniform as to its total surface rather than on a portion thereof, some form of agitation of the silicon carbide and the copper introduced thereinto must be employed. As illustrative of how such may be achieved, it is mentioned that a vessel containing silicon carbide particles may have conventional mechanical agitator means for the fine silicon carbide particles and the molten copper is poured through a screen into the mechanically agitated silicon carbide particles. The latter may also be achieved by another illustrative embodiment which comprises supplying molten copper by spraying through a valve or nozzle into a vessel containing cool and highly agitated or turbulent silicon carbide particles wherein said turbulence is obtained, for example, by rapidly flowing streams of an inert gas.

In this disclosure the term "cool" is used with respect to the silicon carbide particles. However it should be understood that this is a relative term. It may be found desirable, on occasion, to employ high temperatures which are nevertheless below that of the melting point of copper. The effect provided by higher temperatures is a more gradual solidification of the copper insuring better adherence of the silicon carbide particles. One means of obtaining the higher temperatures for the silicon carbide particles is to employ heated gas streams in the embodiment where gas streams are used to create turbulent movement of the silicon carbide particles in the vessel. The cool silicon carbide particles, however, can be maintained at below normal room temperatures; and thus the term "cool" encompasses any temperature beginning below normal but preferably between normal room temperature to just below that of the melting point of copper.

In any case, copper granules once the silicon carbide particles are fused to the surface thereof, are then rinsed with or placed and allowed to stand for a short time in a solution of cupric nitrate. The cupric nitrate solution employed may be of a concentration varying between wide limits. I contemplate the limits of the concentration which can be employed as being between 1 percent to 66 percent by weight of the salt. While any solution having a concentration within these limits is suitable, I prefer nevertheless to use a concentration of cupric nitrate of about 60 percent.

The essential requirement of a particular concentration is to provide an adequate coating of copper oxide on the finished catalyst.

Oxidation of the copper nitrate deposit on the catalyst support is suitably performed with an oxygen containing gas at a temperature in the range of about 200 to 450° C. By oxygen containing gas I include air, as well as a pure stream of oxygen or any artificial mixture of inert gases containing in addition oxygen therein. In some cases, the stream may also include such oxidizing agents as ozone. I have found that the oxidation is advanced to a satisfactory degree in a period of about 3 to 4 hours, although in particular instances a shorter time of oxidizing the catalysts material suffices; and in other cases the oxidation treatment is preferably extended over a longer period of time. It should be mentioned that the catalyst having the wet copper nitrate thereon is preferably dried at a temperature of about 100° C. prior to employing the temperatures for oxidation. The drying technique avoids the loss of copper nitrate when the high temperatures of oxidation are employed initially.

The reduction treatment is more critical than the oxidation of the catalyst. This is primarily due to the advantageous critical ratio between cuprous oxide and cupric oxide desirous in the coating on the support which is about 0.1/1 to 1/0.1 and preferably is about 1/1 to 1/0.75. Other ratios of cuprous to cupric oxide can be employed. Obtaining this critical ratio by reducing with hydrogen, however, presents no problems, as this can be readily determined by various methods such as analyzing the off-gases from hydrogenating the catalyst for the amount of water being emitted. The amount of water formed by reduction of the catalyst is primarily directly related to the amount of oxygen removed from the cupric oxide. The temperature employed for the reducing step will usually be in the range of about 130 to 250° C. I prefer to employ a temperature of about 155° during the reducing stage of the catalyst.

It can be readily seen and appreciated that, in my catalyst wherein the silicon carbide particles are caused to adhere to the surface of the copper granules, the quantities of silicon carbide required are considerably less than where the silicon carbide is employed as the main catalyst support in granular form or in a mixture with the copper. This amounts to a considerable economic savings and is achieved by a substantial reduction in an expensive material involved.

While the size of the copper granules or shot is relatively noncritical and can range from 1 mm. to 10 mm., the particle size of the silicon carbide has more significance with respect to the superiority of my catalyst. Accordingly, I employ silicon carbide particles having a size in the range of 50 to 200 screen mesh. With this in mind and without wishing to be limited in any respects by theory, I believe that the activity of my catalyst and the particle size of silicon carbide effecting this occurs by the creation of active centers in the granules. This is believed to be caused in turn by the stress created in the crystal structure and physical effects in the surface of the copper metal by the silicon carbide particles fused thereinto. The particle size also increases the surface area by a high order. This theory can be better understood from the article entitled "Catalysis," by Dr. Alex G. Oblad, as published in the March 21, 1955, edition of the Oil and Gas Journal, pages 184 to 198.

Assuming my theory is correct as to accounting for the superiority of my catalyst and in any event I have discovered that the particle size of the silicon carbide employed should be in a range of 50 to 200 screen mesh. Some benefits are obtained, however, with particles outside this range where the particles are either larger or smaller. In different terms, this latter may be defined as a percent of the total surface area of the copper mass which the silicon carbide occupies; that is, the exposed surface area of the copper mass is reduced by the silicon carbide fused therein. In defining this on a surface area basis, I contemplate that the silicon carbide particles occupy and reduce the exposed copper surface area in a range of about 50 percent to about 99 percent, thus leaving the remaining about 50 to about 1 percent copper surface exposed as copper before the impregnation. I prefer to employ sufficient silicon carbide particles to occupy about 90 to 98 percent of the surface area of the copper shot.

Of course, it is to be understood that improvements discovered by others heretofore may be additionally employed in this invention. For example, others have found that it is advantageous to add promoters such as the oxide of an alkaline earth metal and to employ stabilizers such as the oxide of an acid forming metal. The latter are known to be, for example, the oxides of chromium, vanadium, and aluminum. Still other improvements in the process of oxidizing the olefin discovered heretofore by others may be employed. Among these are the use of small amounts of a chlorine compound introduced into the reaction zone and/or a diluent such as steam which improve yield and selectivity, respectively.

A catalyst prepared in accordance with the above teachings is subsequently employed in the oxidation of olefins. The features of oxidizing olefins are well known in the art but for completeness are included herein.

Utilization of the catalyst of this invention is generally applicable in the conversion of olefins of three or more carbon atoms to vinyl-type aldehydes or ketones. By the term "olefin" as used herein and in the appended claims is meant the open-chain as well as cyclic olefins. Among the many olefinic compounds which are adapted for use as starting materials, the following may be mentioned: propylene, butene-1, butene-2, isobutylene, pentene-1, pentene-2, 3-methyl-butene-1, 2-methyl-butene-2, hexene-1, hexene-2, 4-methyl-pentene-1, 3,3-dimethyl-butene-1, 4-methyl-pentene-2, octene-1, cyclopentene, cyclohexene, 3-methyl-cyclohexene, etc. These compounds and their various homologues and analogues may be substituted in the nucleous and/or in the substituents in various degrees by straight chain alicyclic and/or heterocyclic radicals. The olefins may be treated individually or as mixtures with each other or with the corresponding or other saturated organic compounds. When treated in mixtures, for example, with the corresponding paraffin, the paraffin may remain substantially, if not wholly, unaffected. In other words, by the present process it is possible to selectively oxidize olefins, saturated compounds if present acting merely as diluents. Conversions effectible by the process of the invention include the conversion of propylene to acrolein, isobutylene to methacrolein, alpha- or beta-butylene to methyl vinyl ketone, pentene-1 or pentene-2 to ethyl vinyl ketone and/or pentene-3-1-2, 2-methyl-butene-2 to methyl isopropenyl ketone, cyclopentene to cyclopentenone-2, and the like.

It is to be noted that the vinyl-type carbonylic products obtained by the process of the invention are not necessarily those which would be expected from the direct substitution of an oxygen atom for two hydrogen atoms in the allyl position, that is, for two hydrogen atoms attached to a carbon atom separated from the double bond by an intervening carbon atom, for in that case beta-butylene, for example, would form crotonaldehyde and not methyl vinyl ketone. Instead, the reaction appears to be initiated at the double bond and proceeds with the elimination of a hydrogen atom from the allyl position and a change in position of the double bond.

Straight chain alpha-olefins of three or more carbon atoms when treated according to the present process tend to yield the same products as the corresponding beta-olefins. Thus, as stated above, alpha-butylene as well as beta-butylene yields methyl vinyl ketone and pentene-1 like pentene-2 yields ethyl vinyl ketone. This is thought to result from insomerization of these alpha-olefins to the beta-olefins under the reaction conditions.

It will be understood, of course, that all these reaction variables are more or less interdependent; and that when one is arbitrarily fixed, the limits within which others may be varied are somewhat restricted. The more desirable ranges for ordinary applications of my invention have been indicated and can also be ascertained from the specific example presented hereinafter. However, for any particular application of my invention, the most desirable conditions can be readily determined by trial by one skilled in the art, such a determination being facilitated by the discussion of trends of these variables presented herein and in the example.

The reaction can be conducted at any pressure commensurate with the temperature at which it is desired to operate but usually the reaction is carried out at pressures near atmospheric pressure or moderately above.

The process of the invention can be executed at conditions which lead to complete consumption of the olefin or the oxygen, which ever is present in the lesser amount, or it more desirably may be executed at conditions which lead to only partial consumption of the reactants in a pass of the reaction mixture over the catalyst. When it is desired to produce methacrolein by the oxidation of isobutylene according to the invention conditions within the following nonlimiting ranges can be employed advantageously:

| | |
|---|---|
| Oxygen concentration in reaction mixture prior to contact with the catalyst, volume percent | 10 to 25. |
| Mole ratio, isobutylene to oxygen | 1.5/1 to 8/1. |
| Balance of feed | Steam and/or inert gases, such as $N_2$, $CO_2$, propane, etc. |
| Apparent contact time, seconds | 0.001 to 15. |

| | |
|---|---|
| Temperature, °C | 250 to 600. |
| Pressure, atmospheres | 1 to 15. |

The following nonlimiting ranges of conditions are preferred for the oxidation of propylene to acrolein according to the invention:

| | |
|---|---|
| Oxygen concentration in reaction mixture prior to contact with the catalyst, volume percent | 4 to 8. |
| Mole ratio, propylene to oxygen | 4/1 to 10/1. |
| Balance of reaction mixture | Steam, or steam and inert gases, such as $N_2$, $CO_2$, propane, etc. |
| Apparent contact time, seconds | 0.1 to 2. |
| Temperature, °C | 250 to 450. |
| Pressure, atmospheres | 1 to 10. |

In the foregoing, the "apparent contact time" is defined as the time in seconds which one volume of the reaction mixture under the conditions of temperature and pressure existing in the reaction zone is in contact with one volume of the catalyst measured in bulk and is calculated in a continuous-flow process from the flow rate of the reaction mixture and the amount (volume) of the catalyst measured in bulk. The oxygen consumption can be controlled conveniently under the otherwise existing conditions by adjustment of the apparent contact time and the reaction temperature, higher temperatures and longer contact times favoring increased consumption of oxygen and vice versa. Conditions generally similar to the foregoing can be employed advantageously for the catalytic oxidation of isobutylene to methacrolein, the straight-chain butylenes to methyl vinyl ketone, etc.

In general, any apparatus of the type suitable for carrying out oxidation reactions in vapor phase can be employed in the execution of the process. When operating, the apparatus can comprise a catalyst packed reaction tube or chamber positioned within a metal block, as an aluminum block or other temperature-regulating means, as a fluid temperature-regulating bath, which is provided with appropriate heating and/or cooling elements. The reactor can be brought to the reaction temperature before or after the vapors to be reacted are introduced thereinto. If before, the olefin can be vaporized in the fore-part of the tube rather than in a separate vaporizer. In large scale operation, it is preferred to carry out the process in a continuous manner, any unreacted olefin and/or oxygen being recirculated with fresh feed. The reaction can be conducted in one or a plurality of reaction zones. In a multiple bed reactor, all or only a part of the olefin and/or the oxygen can be introduced into the initial reaction mixture; for example, when a plurality of catalyst beds connected in series are employed, part of the oxygen can be withheld from the initial reaction mixture and introduced at one or more stages intermediate to two beds of the catalyst. Coolants, e.g., liquid water, can be added to the reaction mixture during the reaction or between the catalyst beds in a system comprising a plurality in order to assist in the disposal of the heat liberated by the reaction.

The unsaturated carbonyl product or products are isolated from the exit gases from the reaction zone by any appropriate means, the exact procedure in any given case being naturally determined by the nature and relative amounts of the other reaction products. Usually the exit gases are scrubbed with cold water or other appropriate solvent to remove the carbonyl product which is subsequently recovered from the solvent by any suitable means, as by distillation. In some cases, the recovery by distillation involves azeotropic distillation. The efficiency of the scrubbing operation can be improved when water is employed as the scrubbing agent by adding a suitable wetting agent, e.g., any soap or soap-like substance to the water. If desired, scrubbing of the reaction gases can be preceded by an initial cold water quenching thereof which of itself can serve to separate a large portion of the carbonyl product.

Where molecular oxygen is being employed as the oxidizing agent the residual mixture subsequent to the separation of the carbonyl product can be treated as with a potassium hydroxide solution of suitable strength to effect the removal of carbon dioxide. The remainder of the mixture which comprises any unreacted olefin and oxygen can then be recycled through the reactor. In the event that air is being used as the oxidizing agent in lieu of molecular oxygen, the residual mixture after separation of the carbonyl product can be scrubbed with a nonpolar solvent, e.g., a hydrocarbon fraction as kerosene, in order to recover unreacted olefin and the remaining gas discarded.

EXAMPLE

*Catalyst preparation*

Copper metal was melted and allowed to fall in small droplets into about 600 ml. of fluid-type silicon carbide aggregates (obtained from The Carborundum Company, Type CEHF) in a nitrogen atmosphere. The silicon carbide aggregates were occasionally stirred so that the molten copper droplets would not fall on top of each other. The loose silicon carbide was screened away from the solidified copper particles which contained a coating of fine silicon carbide particles.

A 100 ml. portion of the copper particles was treated with 17 g. of hydrated cupric nitrate dissolved in 20 ml. of water. The treated particles were dried in an oven at 110° C., heated to 375° C., and treated with air for 3 hours and then treated with hydrogen for 1½ hours at 275° C. The catalyst was allowed to cool in a hydrogen atmosphere.

The finished catalyst was placed in a stainless steel tube of 0.75 inch diameter and about 2 feet in length. The tube was heated to 400° C. and isobutylene at 1,101 ml./min., oxygen at 465 ml./min. and steam (containing traces of isopropyl chloride) at 1,434 ml./min. were passed through the catalyst.

A methacrolein yield of 26 percent (based on oxygen) and a selectivity of 75.5 percent were realized. This corresponds to an isobutylene conversion of 15 percent per pass and an ultimate yield of 75.5 percent on a recycle basis.

It is obvious that many variations can be made in the products and processes of this invention without departing from the spirit and scope thereof as defined in the appended claims.

I claim:

1. A catalyst for oxidizing olefins which comprises a copper oxide coating consisting of a mixture of cuprous and cupric oxides on a support comprising a copper mass varying in size from 1 to 10 millimeters having small particles of silicon carbide fused to about 50 to about 99 percent of the surface thereof.

2. A catalyst according to claim 1 wherein the silicon carbide particles fused to said support mass are of a size varying in the range of 50 to 200 screen mesh.

3. A catalyst according to claim 1 wherein cuprous oxide to cupric oxide in the coating on the support is in a ratio of 0.1/1 to 1/0.1.

4. A catalyst according to claim 1 wherein the silicon carbide particles cover about 90 to about 98 percent of the total surface area of the copper mass.

5. A method of preparing a catalyst for oxidation of olefins which comprises dropping molten copper metal into a vessel containing small particles of silicon carbide with agitation, depositing copper nitrate on the silicon carbide-fused-to-copper shot support, oxidizing said copper nitrate coating to copper oxide in a stream of oxygen containing gas and then partially reducing the copper oxide in a stream of hydrogen.

6. A method according to claim 5 wherein the silicon carbide particles contained in said vessel are of a size varying between 50 to 200 screen mesh.

7. A method of preparing an oxidation catalyst according to claim 5 wherein the oxidation of the copper nitrate coating is performed at a temperature in the range of 200 to 450° C.

8. A method of preparing an oxidation catalyst according to claim 7 wherein the copper nitrate coating is oxidized at about 300° C.

9. A method of preparing an oxidation catalyst according to claim 7 wherein the copper oxide coating is partially reduced in a stream of hydrogen at a temperature in the range of 130 to 250° C.

10. A method of preparing an oxidation catalyst according to claim 9 wherein the temperature of the partial reduction of the copper oxide is at about 155° C.

References Cited by the Examiner

UNITED STATES PATENTS

| 2,451,485 | 10/48 | Hearne et al. | 252—443 |
| 2,601,121 | 6/52 | Mattox | 252—443 |
| 2,807,647 | 9/57 | Cheney et al. | 260—604 |
| 2,810,763 | 10/57 | Hadley et al. | 260—604 |
| 2,950,258 | 8/60 | Pitzer et al. | 252—443 |

OTHER REFERENCES

Berkman et al.: Catalysis (1940), pp. 285–289.

MAURICE A. BRINDISI, *Primary Examiner.*

CHARLES B. PARKER, JULIUS GREENWALD,
*Examiners.*